Sept. 23, 1969  L. L. MIELKE  3,468,570

SAFETY PIVOT CONNECTION

Filed Aug. 15, 1967

INVENTOR.
Lloyd L. Mielke
BY John A. Hamilton
Attorney.

United States Patent Office 3,468,570
Patented Sept. 23, 1969

3,468,570
SAFETY PIVOT CONNECTION
Lloyd L. Mielke, 4125 Hawthorne Circle,
Kansas City, Mo. 64116
Filed Aug. 15, 1967, Ser. No. 660,773
Int. Cl. F16c 11/00; B25g 3/38
U.S. Cl. 287—100
9 Claims

ABSTRACT OF THE DISCLOSURE

A safety pivot connection intended primarily for making pivotal connections in aircraft control linkages, and comprising a flanged sleeve insertable slidably in matching holes of the links or other work pieces, said sleeve having a portion of reduced diameter adapted to project outwardly from said work pieces and having an outwardly facing shoulder at the juncture of said reduced end portion with the body portion thereof, a washer engageable on said reduced portion, a bolt insertable through said sleeve to project from the reduced end thereof, and a nut threaded on said bolt and operable to force said washer against said shoulder and to flange the reduced portion of said sleeve outwardly to retain said sleeve and washer even if the bolt should fail.

---

Figure 1:
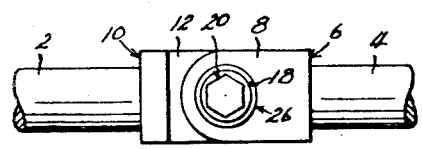

This invention relates to new and useful improvements in pivotal connections generally of the bolt type. It has been conceived and developed primarily for connecting links in aircraft control systems, where failure of the bolt or other member making the connection can obviously have catastrophic consequences, but as will readily appear it has many other uses and applications. Such connections are ordinarily made with bolts, and while various lock nuts and other safety devices have been devised for preventing accidental loss of the nut and/or the bolt itself, these have proven to be at best only partial solutions to the problem, since the bolt itself may fail, particularly as a result of fatigue caused by the severe vibration to which it is commonly subjected in aircraft usage, and particularly at points of normal stress concentration in the bolt such as at the roots of the bolt threads, or at the joinder of the bolt head and shank. Thus, the bolt head, or the nut and threaded portion of the bolt shank, sometimes fracture and fall away, with a subsequent and very real danger that the entire bolt will be lost and certain control functions sacrificed. Also, some bolts must be set tightly, with the result that the pivotal action of the connection is unduly inhibited. And if the bolt is not drawn up tightly, it may be free to vibrate, and thus be more likely to fail by fatigue fracture. Actually, bolts in general are less subject to fatigue failure if maintained under stress, there being well known optimum stresses for this purpose. Finally, the lock nuts or other special bolt fasteners often required in critical locations often are extremely difficult to remove, and this of course increases the problems of repair, replacement or maintenance.

Accordingly, the object of the present invention is the provision of a safety pivot connection of the general character described which largely obviates the chances of failure of the connection for any of the above enumerated causes, and which consequently represents a substantial advance in aircraft safety. Essentially, the safety pivot connection as contemplated by the present invention comprises a tubular sleeve adapted to be inserted slidably in matching holes of the work pieces, said sleeve having a flange at one end adapted to engage one exterior face of the work pieces and being shouldered to provide a portion of reduced diameter projecting outwardly from the distal exterior face of the work pieces, a washer slidably applicable over said reduced sleeve portion and engageable with the sleeve shoulder, and means for flaring said reduced portion of the sleeve outwardly at the outer face of the washer. The last named means may constitute a bolt insertable through the sleeve and having a special nut operable to flare the sleeve, the bolt and nut preferably being left in place when the connection is completed to provide extra strength. However, the bolt could be removed after flaring the sleeve, or a flared mandrel or other suitable tool could be used to flare the sleeve. If the bolt is retained, the pivotal connection will be retained safe by the sleeve and washer even if the bolt should fail and become lost in use due to failure of the head, shank or threads thereof. The sleeve shoulder retains the washer at a distance from the sleeve flange a little greater than the thickness of the work pieces, so that the pivotal connection is not axially loaded by the bolt stress to inhibit movement thereof. Any axial loading which might actually be desired can be supplied by a spring washer inserted under either the flange or the flaring washer of the sleeve. The spring washer also tends to prevent vibration of the sleeve-bolt assembly in the holes of the work pieces. At the same time, the seating of the flaring washer on the shoulder of the sleeve permits both the sleeve and the bolt to be axially stressed to any desired degree, the bolt in tension and the sleeve in compression, to reduce the possibility of fatigue failure. A special torque nut may be employed on the bolt to provide the optimum stress automatically. Finally, the connection can be demounted easily by first removing the bolt and nut, and then forcing the flared portion of the sleeve through the flaring washer. Either or both of the sleeve flange and the flaring washer are specially designed to accept prying tools for this purpose, and the diameter reduction of the sleeve portion engaged by the washer permits easy withdrawal of the sleeve through the work piece holes even if the flare should not be completely reduced by its withdrawal through the washer, or should rebound somewhat after such withdrawal.

Another object is the provision, in a connection of the character described of means preassembling the nut and washer thereof, thereby promoting greater convenience of usage, and precluding a possibility that the parts could be assembled incorrectly.

Other objects are simplicity and economy of construction, efficiency and dependability of operation, and adaptability for use in a wide variety of applications.

Figure 2:
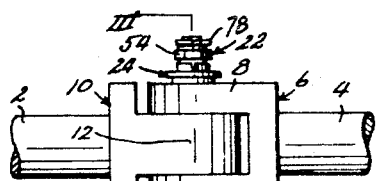
Figure 3:
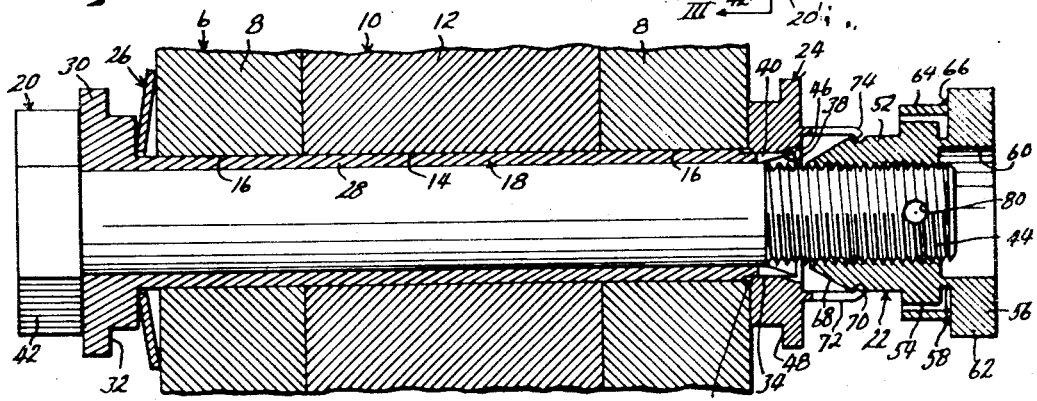
Figure 4:
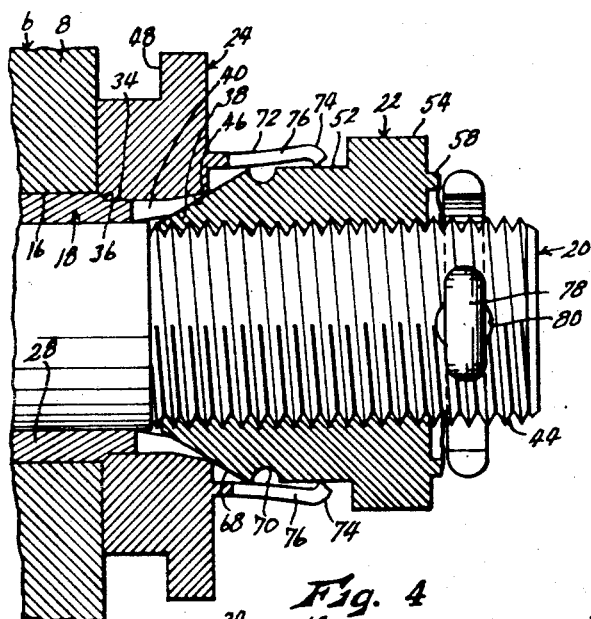
Figure 5:
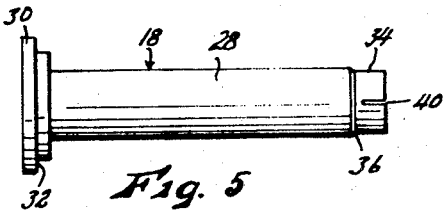
Figure 6:
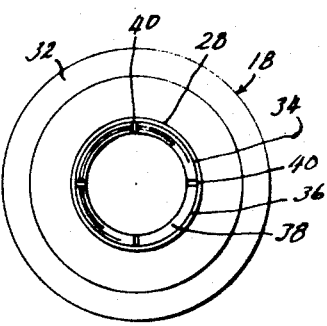
Figure 7:
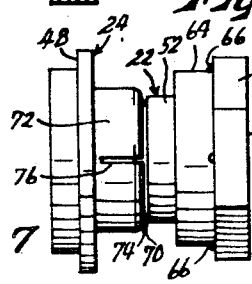
Figure 8:
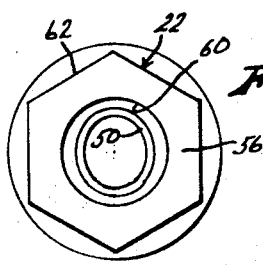

With these objects in view, as well as other objects which will appear in the course of the specification, reference will be had to the accompanying drawing, wherein:

FIG. 1 is a side elevational view of a safety pivot connection embodying the present invention, FIG. 2 is a top plan view of the parts shown in FIG. 1, FIG. 3 is an enlarged, fragmentary sectional view taken on line III—III of FIG. 2, left partially in elevation, and showing the connection at an intermediate stage of completion, FIG. 4 is an enlarged, fragmentary view similar to FIG. 3, showing the connection completed, FIG. 5 is a side elevational view of the sleeve element of the connection, FIG. 6 is an enlarged end view of the sleeve as shown in FIG. 5, FIG. 7 is a side elevational view of the washer-nut assembly of the connection, and FIG. 8 is an end view of the assembly as shown in FIG. 7.

Like reference numerals apply to similar parts throughout the several views, and the numerals 2 and 4 apply respectively to a pair of links to be joined for relative pivotal movement about an axis transverse to their axes. Link 4 is provided with an end fitting 6 constituting a clevis having a pair of parallel, spaced apart leaves 8 extending longitudinally of the link, and link 2 is provided with an end fitting 10 having a single leaf 12 extending longitudinally of the link and disposed rotatably between leaves 8 of link 4. A bore 14 formed transversely through leaf 12 is coaxially aligned with bores 16 of equal size formed in leaves 8, and it is intended that links 2 and 4 be relatively pivotable about the common axis of bores 14 and 16. Leaves 8 and 12 will hereinafter for convenience be referred to simply as "work pieces," since it will be readily apparent that the connecting means hereinafter described is adapted for connecting work pieces other than the leaves of a clevis-type pivotal joint.

The connection as contemplated by the present invention includes a sleeve 18, a bolt 20, a nut 22, a rigid washer 24, and a spring washer 26. Sleeve 18 comprises a cylindrical tubular body portion 28 formed of steel or other suitable material having an external peripheral flange 30 at one end thereof, said flange being undercut to form a peripheral groove 32 for prying purposes, as will be described. The opposite end portion of the sleeve is reduced in external diameter, as indicated at 34, thereby forming a peripheral shoulder 36 facing toward said reduced portion. The distance from flange 30 to shoulder 36 is preferably somewhat greater than the combined thickness of the workpieces 8 and 12, for reasons which will presently appear. The extreme end portion of the sleeve, within reduced portion 34 thereof, is internally chamfered as indicated at 38, and said chamfered portion may be longitudinally split at angular intervals thereabout, as indicated at 40. Said sleeve is adapted to be inserted slidably through bores 14 and 16 of the work pieces, and spring washer 26, which may be of any suitable type, is inserted between flange 30 and one face of the work pieces. Bolt 20 is of standard form, having a head 42 at one end and having external threads 44 at its opposite end. Said bolt is adapted to be inserted slidably through sleeve 18 until head 42 engages flange 30, and is of such length as to project outwardly from the reduced end of said sleeve.

Rigid washer 24 is thick and strong, and has an internal diameter such that it may be engaged slidably over the reduced portion 34 of the sleeve, so as to engage the face of the work pieces opposite to that engaged by spring washer 26, and also to engage shoulder 36 of the sleeve. Preferably, both the shoulder and the portion of washer 24 engaged thereby are inclined obliquely to the connection axis. This tends to reduce stress concentrations in the sleeve, and hence to reduce the possibility of fatigue fracture of the sleeve. The portion of the internal bore of washer 24 adjacent the outer face of said washer is also taperingly enlarged, as indicated at 46. The outer periphery of washer 24 is undercut at the side thereof adjacent the work pieces to form a prying groove 48, in the same manner as sleeve flange 30.

Nut 22 is adapted to be threaded on bolt 20 outwardly of washer 24. As will be seen in FIG. 8, the internal threads 50 of said nut are initially somewhat elliptical, so as to engage the bolt very tightly by virtue of the fact that the bolt must expand the nut somewhat as the nut is applied. This constitutes the nut as a lock-nut, so that once applied it cannot easily be shaken loose by vibration or the like. As best shown in FIGS. 3 and 4, nut 22 has an externally cylindrical body portion 52 which is internally threaded and which has external wrench flats 54, and an axial outward extension 56 which is connected to body portion 52 by a reduced, frangible neck 58. Extension 66 does not engage the bolt, being counterbored at 60 to a larger diameter than said bolt. Externally, extension 56 is provided with wrench flats 62 of a larger size than wrench flats 54 of the nut body. A cylindrical skirt 64 is affixed at one end to extension 56 coaxially therewith, as by spot welding 66, and extends toward the nut body to enclose wrench flats 54 therein, as best shown in FIG. 3. Sleeve 64 could also be integral with the nut.

The inner end of body portion 52 of the nut forms a taperingly reduced nose-piece 68.

Body portion 52 of the nut has a peripheral groove 70 formed in the exterior surface thereof. A cylindrical skirt 72 is affixed to or formed integrally with washer 24, coaxially therewith, and extends outwardly therefrom to encircle the body portion of said nut. The extreme outer end portion of said sleeve is rolled or otherwise deformed at 74 to project into groove 70, thereby holding the nut and washer 24 in assembly. Said skirt may be slit longitudinally at angular intervals thereabout, as indicated at 76, to permit resilient expansion of said skirt. When the nut and washer are thus assembled, they are spaced apart in a direction parallel to their axis, the nose-piece 68 of the nut not being engaged in the interior taper 46 of the washer.

In the application of the connection, sleeve 18 is first inserted through bores 14 and 16 with spring washer 26 under flange 30 thereof, bolt 20 is inserted, and washer 24 and nut 22, preassembled as shown in FIGS. 3, 7 and 8, are applied to the bolt, the bolt threads first engaging in nut body 52, and the inner bore of washer 24 later engaging slidably over reduced portion 34 of sleeve 18. The nut is turned by means of any suitable wrench applied to wrench flats 62 of nut extension 56. The nut is turned till washer 24 engages the adjacent face of the work pieces, the parts then having the relative positions shown in FIG. 3. At this time, washer 24 has not engaged shoulder 36 of the sleeve, since spring washer 26 has not yet been compressed. Rotation of the bolt is prevented by a wrench applied to head 42 thereof. Nut 22 is then rotated still further to advance it along the bolt, while washer 24 cannot advance since its movement has been arrested by engagement with the work pieces. Therefore the nut must move toward washer 24, in a direction parallel to the joint axis, this movement being permitted despite the preassembly of the nut and washer by the fact that the rolled lip 74 of the washer skirt 72 is then cammed radially outwardly from nut groove 70, and rides along the cylindrical body portion 52 of the nut, as indicated in FIG. 4. Therefore, as the nut is drawn up, bolt 20 is advanced to the right as viewed in FIGS. 3 and 4, whereby to compress spring washer 26, and nose piece 68 of the nut is drawn to the left to enter the internal chamber 38 of reduced portion 34 of sleeve 18, flaring said sleeve outwardly into the taperingly enlarged portion 46 of the bore of washer 24, as shown in FIG. 4. The slits 40 of the sleeve render the flaring thereof somewhat easier, but are not essential, particularly in smaller sizes. Rotation of the nut is continued until sleeve shoulder 36 is drawn against washer 24. The sleeve must therefore, in a very slight degree, move axially through the work pieces, and through washer 24, at the same time it is being flared within the washer, but this is permitted by molding or "flowing" of the chamfered end of the sleeve as the nut is drawn up. For reasons to be discussed later, it is preferred not only that the flaring of the sleeve occur entirely within washer 24, not at the outer face thereof, but also that the angles of taper of the sleeve, nut and washer be so selected that when the nut is drawn up as just described, the space between washer taper 38 and nose-piece 68 of the nut be completely filled with the metal of the chamfered portion of the sleeve. For this purpose, the sum of the angle of taper 38 and chamfer 46 should be equal to the angle of taper of nose piece 68, all of said angles being measured from the joint axis.

After the flaring of the sleeve has been accomplished as just described, still more torque is applied to the nut, thereby further tensioning the bolt and applying a corresponding compressive force to the sleeve, until nut extension 56 breaks away from nut body 52 by the fracture of frangible neck 58 of the nut. As has been previously mentioned, it is known that the bolt and sleeve will better resist fatigue fractures due to vibration if they are maintained under stress, and for any size bolt, a nut can be provided the neck 58 of which will fracture at a torque which will provide the optimum bolt tension for this purpose. However, it is of course necessary that the torque required to fracture the nut be less than the torque required to flare the sleeve, in order that the flaring will be completed before the nut breaks. Skirt 64 shields wrench flats 54 so that no wrench can be applied to the latter at this time. This prevents a workman from accidentally tightening the nut by applying a wrench to flats 54, in which event he could easily over-tension the bolt. It would of course be possible to tension the bolt by forcing washer 24 directly against the work pieces, eliminating sleeve shoulder 36. However, this would not compress the sleeve, and would apply a direct axial load to the work pieces, possibly inhibiting free pivotal movement of links 2 and 4. Thus by using shoulder 36, and spacing it apart from flange 30 by a distance greater than the thickness of the work pieces, the sleeve is compressed, and the connection left loose for free pivoted movement of the links. This arrangement could leave the bolt-sleeve assembly free to vibrate in the work pieces, if the sleeve fits loosely in the work piece bores, or wears loose, and this is of course undesirable. However, spring washer 26 may be quite stiff, and serves to prevent such vibration.

Finally, even though nut 52 is a lock nut, as previously mentioned, the connection may be still further secured, after nut extension 56 has broken away, by inserting a cotter pin 78 through a transverse hole 80 formed transversely through the bolt, outwardly from the nut. The connection is then complete, the parts having the relative positions shown in FIG. 4. Besides the advantages of leaving the pivotal connection as freely movable as desired, and nevertheless tensioning the bolt and sleeve to provide optimum resistance to fatigue fracture, as already discussed, the connection is virtually fail-safe. The nut, being a lock nut further secured by the cotter pin, is extremely unlikely to loosen or become lost. It could be lost if the bolt itself should fail by fatigue fracture or other cause. The bolt and sleeve are protected from fatigue fracture by the stressing thereof, but even if the bolt should fail and be entirely lost, the connection will be maintained safe by sleeve 18, which is retained in place by virtue of its flaring within washer 24. The sleeve metal is sufficiently ductile that it will remain flared even if the nut is withdrawn therefrom. Ordinarily, it is desirable that the bolt be left in place after the sleeve is flared, since said bolt imparts substantial transverse strength to the connection. In some applications, however, transverse strength may not be critical and the bolt dispensed with. In that case the flaring of the sleeve could be accomplished by means of a flared mandrel inserted through the sleeve and pulled from the opposite side of the work pieces.

Easy removal of the connection for repair or maintenance work is also important to the utility and convenience of such a device, and the present structure also possesses this feature. It is removed by first withdrawing cotter pin 78, unscrewing nut 22 from the bolt and removing the bolt, then inserting any suitable prying tool, such as a screwdriver bit, into prying groove 32 of flange 30, or prying groove 48 of washer 24, and prying outwardly to force the flared portion of the sleeve through washer 24. Even if the flare of the sleeve should not be completely reduced by its passage through the washer, or if it should rebound slightly outwardly after its passage through the washer, the fact that it was formed in the portion 34 of said sleeve which is of reduced diameter permits easy withdrawal of the sleeve through the work pieces.

The advantages of flaring the sleeve entirely within the washer rather than at the outer face thereof, and the selection of the angles of taper involved in the flaring so that the sleeve must fill the space between the cooperating tapers of the nut and washer, are that they provide a uniform holding power securing the washer on the sleeve when the flare must be relied on for this purpose, and also that the washer can be pried off of the sleeve with a predictable force when demounting the connection as just described. If the sleeve were flared outside of the washer, or if the flare did not completely fill the space between the nut and washer, the flared portion of the sleeve could assume various forms and shapes. Depending on this form, the flare might either provide inadequate holding power, or render the prying of the washer off of the sleeve unduly difficult. By forming the flare entirely in the washer, as by making the length of the reduced portion 34 of the sleeve equal to the thickness of washer 24, and by providing that the flared portion of the sleeve must fill the space between the nut and washer, as by making the angle of taper of the nut equal to the sum of the taper of sleeve chamber 38 and washer bore 46, it is insured that the sleeve will be flared uniformly, and will provide a uniform holding power, so long as a minimum requisite torque is applied to the nut. The use of a torque nut as described guarantees the application of the requisite torque.

The preassembly of the nut and washer, as shown, is a convenience in that the workman has fewer parts to handle, and is also a fool-proofing measure in that it prevents such human errors as applying washer 24 in a reversed position, or the use of a nut and washer not specifically designed for use together. Skirt 64 forces the workman to use wrench flats 62 in making up the connection rather than flats 54, so that so long as he torques the nut till neck 58 fractures, he can neither under-torque the nut, which could result in incomplete flaring of the sleeve, nor over-torque it, which could result in over-stressing the bolt.

While I have shown and described a specific embodiment of my invention, it will be readily apparent that many minor changes of structure and operation could be made without departing from the spirit of the invention.

What I claim as new and desire to protect by Letters Patent is:

1. A safety pivot connection for connecting work pieces having coaxially aligned bores opening through distal faces thereof, said pivot connection comprising:
   (a) a tubular sleeve adapted to be inserted slidably through said bores, said sleeve having an external flange at one end thereof adapted to engage one face of one of said work pieces and being of such length as to project outwardly from the distal face of said work pieces,
   (b) a washer adapted to be engaged slidably over the extended end portion of said sleeve, and
   (c) means for flaring the end of said sleeve opposite from said flange radially outwardly to resist withdrawal of said sleeve through said washer, said flaring means comprising a bolt insertable through said sleeve, said bolt having a head engageable with said sleeve flange and being of such length as to project outwardly beyond said washer, and a nut threaded on the extended end of said bolt and having a tapered nose piece confronting said washer and operable to enter and flare the adjacent end of said sleeve.

2. The device as recited in claim 5 wherein said sleeve is externally shouldered whereby the end portion thereof opposite from the flange thereof is reduced in diameter, the length of the reduced portion of said sleeve being equal to the thickness of said washer and said reduced portion being internally chamfered to be taperingly enlarged in internal diameter toward its extreme end, the internal bore of said washer being taperingly enlarged toward the outer face of said washer, said washer being engaged on said reduced sleeve portion whereby to be forced against said shoulder by the flaring of said sleeve, said shoulder being spaced from said flange a distance greater than the thickness of said work pieces.

3. The device as recited in claim 2 wherein the angle of taper of the nose piece of said nut, measured from the axis of the nut, is equal to the sum of the angles of taper of the chamfered portion of said sleeve and the internal bore of said washer.

4. The device as recited in claim 1 wherein said nut constitutes a lock nut so formed as to resist strongly any rotation thereof on said bolt.

5. The device as recited in claim 1 wherein said nut comprises:
   (a) a body portion threadable on said bolt,
   (b) an axial extension free from said bolt and having means operably engageable by a wrench to turn said nut, and
   (c) frangible means rigidly interconnecting said nut body and extension and operable to break in response to a predetermined torque applied to said extension, said torque being greater than the torque required to cause said nut to flare said sleeve.

6. The device as recited in claim 3 wherein said nut comprises:
   (a) a body portion threadable on said bolt and including said nose piece,
   (b) an axial extension free from said bolt and having wrench engaging means thereon, and
   (c) frangible means rigidly interconnecting said nut body and extension and operable to break in response to a predetermined torque applied to said extension, said predetermined torque being greater than the torque required to cause said nut nose piece to flare the chamfered portion of said sleeve into full area contact with the tapered internal bore of said washer.

7. The device as recited in claim 5 wherein said nut body also has an external wrench-engaging formation, and with the addition of a skirt member affixed to said nut extension and positioned to enclose the wrench-engaging formation of said nut body so long as said extension is connected to said nut body by said frangible means.

8. The device as recited in claim 1 with the addition of means for preassembling said washer and said nut to facilitate their application to said sleeve and said bolt respectively, said preassembling means being operable to retain said washer and nut in coaxially aligned relation and spaced apart in a direction parallel to their axes, and being yieldable on the application of substantial force to permit movement of said nut toward said washer.

9. The device as recited in claim 8 wherein said nut has a shallow peripheral groove formed externally therein, and wherein said preassembling means comprises a sleeve member affixed coaxially to said washer and extending outwardly therefrom to encircle said nut, the outer end of said sleeve being lipped inwardly to engage in said groove.

References Cited

UNITED STATES PATENTS

| | | | |
|---|---|---|---|
| 2,254,450 | 9/1941 | Ronish | 301—5.7 X |
| 2,312,396 | 3/1943 | Enley | 301—5.7 |
| 2,780,830 | 2/1957 | Kammerer | 287—100 X |
| 2,884,273 | 4/1959 | Sznycer | 287—100 |
| 3,142,085 | 7/1964 | Black | 16—21 |

CARL W. TOMLIN, Primary Examiner

W. L. SHEDD, Assistant Examiner

U.S. Cl. X.R.

16—169; 74—579; 280—515; 305—58